United States Patent [19]

Barefoot

[11] Patent Number: 5,566,795
[45] Date of Patent: Oct. 22, 1996

[54] BRAKING SYSTEM FOR A RAIL CAR

[76] Inventor: Richard Barefoot, 116 Gap Creek Rd., Marietta, S.C. 29661

[21] Appl. No.: 294,976

[22] Filed: Aug. 24, 1994

[51] Int. Cl.⁶ ............................................. F16D 57/02
[52] U.S. Cl. ............................ 188/294; 188/292; 192/61
[58] Field of Search ....................... 188/290, 291, 188/292, 293, 294, 295, 304; 192/61; 137/599; 138/94; 303/11

[56] References Cited

U.S. PATENT DOCUMENTS

| | | | |
|---|---|---|---|
| 3,918,558 | 11/1975 | Bryant | 188/304 |
| 5,294,081 | 3/1994 | Malon | 246/182 R |
| 5,325,944 | 7/1994 | Livingston, Sr. | 188/294 |
| 5,333,705 | 8/1994 | Lemaire et al. | 188/71.5 |
| 5,338,106 | 8/1994 | Rothen et al. | 303/9.69 |
| 5,345,878 | 9/1994 | Jacob | 105/136 |
| 5,358,081 | 10/1994 | Kaneda et al. | 188/291 |

OTHER PUBLICATIONS

Locomotive Brakes Still Evolving, by D. Chovan, Progressive Railroading, pp. 47–53, Feb., 1994.
Improving Freight Car Braking, Progressive Railroading, pp. 43–48, Aug., 1992.

Primary Examiner—Robert J. Oberleitner
Assistant Examiner—Peter M. Poon
Attorney, Agent, or Firm—Dority & Manning, P.A.

[57] ABSTRACT

A hydraulic braking system for a rail car is provided. The system includes a hydraulic pump or motor adapted to engage a rail car axle or wheel. When rotating, the axle or wheel drives the hydraulic pump causing a hydraulic fluid to circulate. By restricting the flow of fluid to the pump, a braking force can be applied to the axle for slowing and stopping the rail car. Various programmable electronic controls can be added to the braking system for allowing control at a central location.

22 Claims, 4 Drawing Sheets

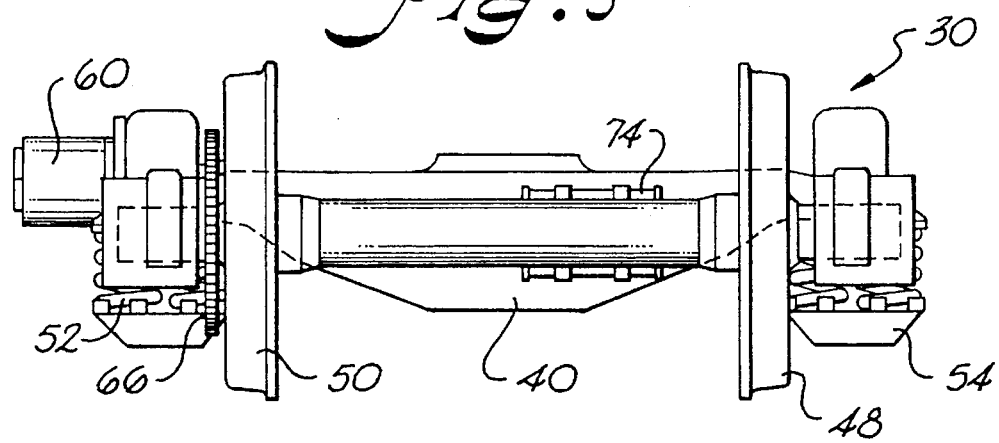
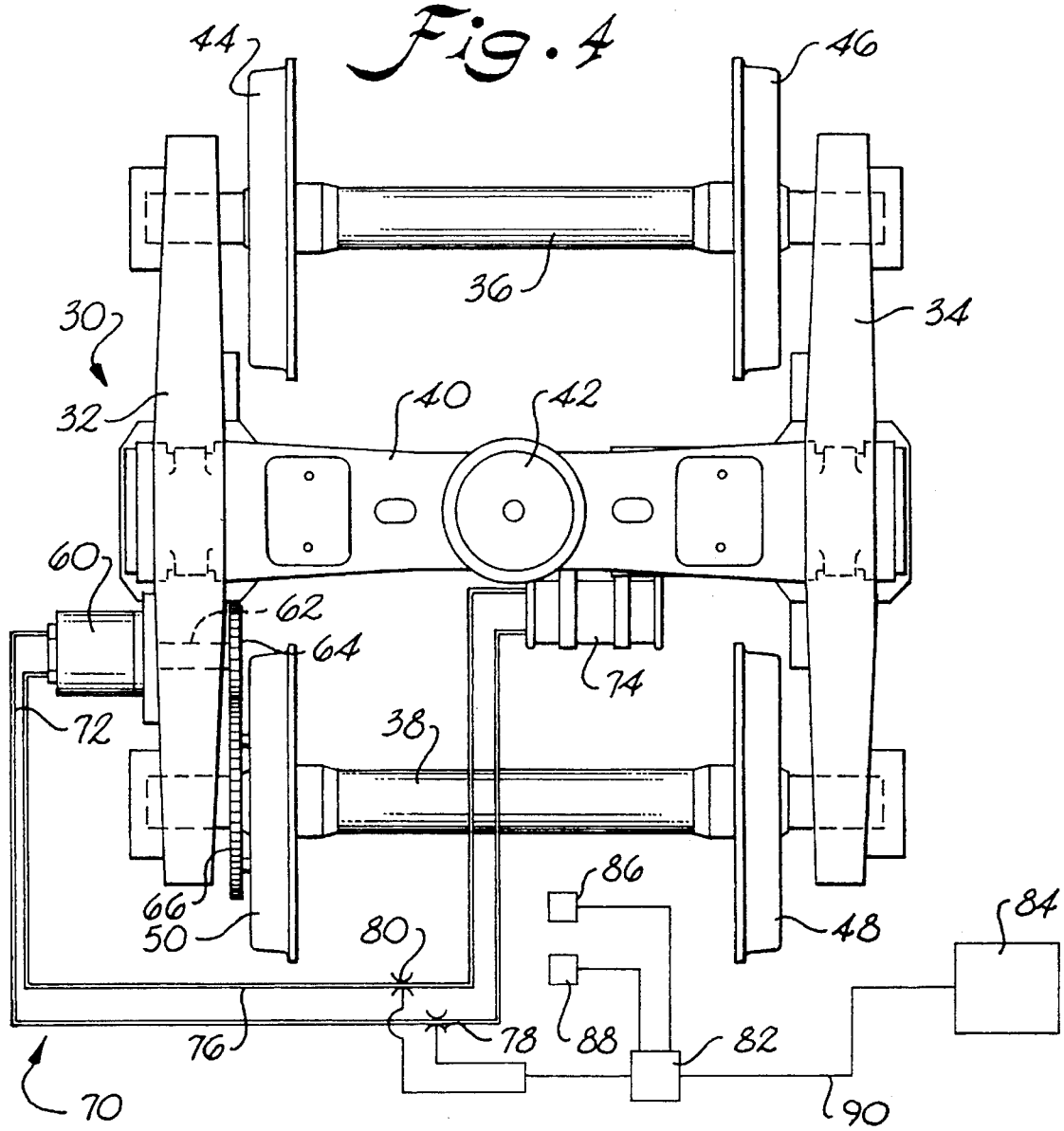

BRAKING SYSTEM FOR A RAIL CAR

BACKGROUND OF THE INVENTION

The present invention generally relates to a braking system for trains and more particularly to a hydraulic braking system for a rail car.

In 1869, the first successful demonstration of a pneumatic or air braking system installed on a train was carried out. Since that time, the railroad industry has focused entirely on pneumatics for braking and stopping trains. Although a considerable amount of evolution has occurred, train braking systems today work under the same principles and practicality as that first air braking system demonstrated in 1869.

In general terms, an air braking system for trains includes a compressor powered by the locomotive which supplies air down the length of the train. When applying the brakes, air enters cylinders which activate pistons. The pistons are pushed out which force brake shoes against the wheel causing the train to slow down. Although presently there are different types of air braking systems, they all work under the same principles and include common mechanisms.

In particular, a typical train air brake system consists of an air compressor located in the locomotive and powered by the engine. The air compressor provides compressed air through a feed valve and a brake valve to a brake pipe. The brake pipe runs the entire length of the train and is connected between rail cars when the cars are coupled together. In communication with the brake pipe, each rail car contains two air reservoirs, a control valve and a brake cylinder. The two air reservoirs include an auxiliary reservoir and an emergency reservoir.

The brake valve to which the conductor of the train has access, typically has four different positions for operating the air braking system. Those positions include the running position, the service position, the lap position and the emergency position.

When the brakes are not being applied, the brake valve is placed in the running position. During this position, air supplied from the compressor is fed to each car via the brake pipe. At each car, the air goes through the control valve and charges the air reservoirs. Air is stored in these reservoirs as potential energy for later applying the brakes as will be described hereinafter.

In order to apply the brakes, the brake valve is first switched to the service position. When switched to this position, the compressor no longer supplies air to the brake pipe. Instead, air is bled off the brake pipe at a controlled rate. This reduction in pressure causes the control valve contained in each rail car to connect the auxiliary reservoirs to the brake cylinders. Air from the auxiliary reservoir then flows into the brake cylinder which activates a piston. The piston in turn moves the brake shoes against the wheel causing the train to decelerate.

After a certain amount of time, and after the brake pipe has lost a particular amount of pressures the brake valve is switched to the lap position during the braking process. In the lap position, the brake pipe is slowly blanked off not allowing any further air to escape. Air pressure within the system then begins to equalize between the brake pipe and the auxiliary reservoir. This equalization causes the control valve contained in each car to reduce flow from the auxiliary reservoir to the brake cylinder which holds the brakes in an applied position. If more braking power is needed, the brake valve is again placed in the service position and the cycle is repeated. To remove the brakes, the brake valve is placed back in the running position.

If an emergency exists and the train needs to be stopped as soon as possible, the brake valve can also be placed in an emergency position. In many trains, an emergency application can be made not only from the brake valve but from any part of the train by a conductor valve. When placed in the emergency position, the brake pipe is valved directly to the atmosphere causing a rapid reduction in air pressure. This sudden drop in pressure not only causes each control valve to connect the auxiliary reservoir to the brake cylinder but also causes the emergency reservoir to be channeled to the brake cylinder. The emergency reservoir and the auxiliary reservoir combine to provide air at a high pressure for applying the brake pads to the wheels with more force. This force typically causes the wheels of the train to lock.

The above-described air brake system for rail cars also contains a built in emergency braking feature. As discussed above, the brakes are applied when air pressure in the brake pipe is decreased. As such, if for any reason the train or cars become uncoupled or any other event occurs in which air is lost in the brake pipe, the brakes automatically apply to the wheels of the cars. This arrangement provides a safe backup system against brake failure which in essence causes the train to stop rather than to lose its brakes.

Also, the train air braking system is typically supplemented with a hand brake system. A hand brake is provided for each car for supplying a braking force for parking the rail cars or stopping the cars when the air source from the locomotive is not available.

The air braking system currently being used by the railroad industry has been proven safe and effective in slowing and stopping rail cars. In fact, the braking system cannot be blamed for increasing derailments or accidents. However, use of the system still has its drawbacks and deficiencies. In particular, the present braking system used in rail cars is very expensive to install and maintain.

For instance, in the August 1992 issue of *Progressive Railroading*, pages 43–48, in an article entitled "Improving Freight Car Braking," it is estimated that air brake system maintenance costs for freight cars is about 120 Million Dollars annually. Further brake related wheel set costs are estimated at 384 Million Dollars annually while train stop delay costs are about 48 Million Dollars annually. Train stop delay costs include the costs of train stops made due to brake system problems.

Air brake system maintenance costs as estimated above include those costs due to routine testing, maintenance procedures and cycles, and especially the replacement of brake shoes. Because of the increasing weight of freight cars, longer train lengths, and higher speed requirements, current brake shoes wear extremely fast. Also, besides outright wear, brake shoes are commonly replaced due to deterioration, cracking, or taper wear. Taper wear is a condition in which one end of a brake shoe has worn much faster than an opposite end. In having to replace brake shoes, costs are not only incurred for parts and labor but also for downtime of the particular freight car. As such, a need exists for a braking system for a railroad car that does not rely on brake shoes.

Besides brake shoe replacement, wheel repair and replacement is another large maintenance cost item associated with current pneumatic braking systems. In particular, action of the brake shoe against the wheel not only wears down the shoe, but can also have a detrimental effect on the wheel. Specifically, when the brakes are applied the wheel acts as a heat sink. High thermal gradients can form causing thermal cracking in the high stress areas. The cracks can form anywhere on the wheel due to heat dissipation from the brake shoe on the wheel tread. Besides stress cracks, high thermal gradients can also lead to flat spots on the wheel tread. Further, the action of the brake shoe on the wheel can cause spalling. Spalling refers to the formation of martensite on the wheel due to thermal cycles. Martensite is hardened carbon steel which causes wheels to not function adequately, leading to their removal.

Besides exorbitantly high maintenance costs, the presently used pneumatic braking system also includes other disadvantages. For instance, when the brakes are applied in an air brake system, the actuating signal is transmitted down the length of the train by air contained in the brake line. The speed of this signal is therefor limited. Consequently, in longer trains it may take up to five or six seconds before the brake signal is transmitted to the last car. This delay creates a wave action causing the cars to push into each other or "bunch." As such, a need exists for a braking system for a freight car with a faster brake response time.

SUMMARY OF THE INVENTION

The present invention recognizes and addresses the foregoing disadvantages, and others of prior art constructions and methods.

Accordingly, it is an object of the present invention to provide a braking system for use with freight car trains.

It is another object of the present invention to provide a braking system for a freight car that does not include brake shoes and that does not produce thermal gradients in the wheels induced by shoes.

It is another object of the present invention to provide a hydraulic braking system for a rail car.

Another object of the present invention is to provide a braking system for a rail car that prevents the train from bunching and stretching when the brakes are applied.

Still another object of the present invention is to provide a braking system for a rail car that can be actuated with electrical signals.

These and other objects of the present invention are achieved by providing a braking system for a rail car. The braking system includes a hydraulic pump in operative association with an axle and/or wheel assembly of a rail car such that the hydraulic pump is driven by the axle when the axle is rotating. A hydraulic fluid circulation loop is placed in communication with the hydraulic pump for supplying, receiving and circulating an hydraulic fluid to and from the pump. The braking system further includes fluid restrictive means positioned within the circulation loop for regulating the flow of hydraulic fluid to and from the pump, wherein by restricting the flow of fluid from the pump, the pump exerts a braking force on the axle for slowing and stopping a mowing rail car.

The braking system can further include a fluid reservoir as an integral part of the hydraulic circulation loop for storing and cooling the hydraulic fluid. Another feature that can be added to the system is a control means for controlling the fluid restrictive means. In one embodiment, the fluid restrictive means can include electronically actuated valves while the control means can include a microprocessor having a user operated input means for receiving commands from a user. Velocity transducers can be placed on the rail car for sensing the velocity of a rail car wheel in relation to a railway track and for transmitting this information to the microprocessor. The microprocessor can then determine the appropriate braking force needed to be applied to the rail car for carrying out a user command. By using velocity transducers, the microprocessor will be able to instantaneously monitor and adjust the valves for preventing the wheels of the rail car from locking and sliding on a railway track during the braking process.

In order to place the hydraulic pump in operative association with the rail car axle and/or wheel, at least one gear connected to the hydraulic pump can be included for engaging a corresponding gear affixed to the axle of the rail car. In another embodiment, the hydraulic pump can be integral with a bearing arrangement for operatively engaging the axle.

These and other objects are also achieved by providing a method for applying a braking force to a rail car. The method includes the steps of providing a hydraulic pump. The hydraulic pump can be placed in operative communication with a hydraulic fluid circulation loop which contains an incompressible hydraulic fluid. The hydraulic pump can be placed in engagement with a rail car axle such that the rotation of the axle causes the pump to circulate the hydraulic fluid around the circulation loop. The method further includes the step of restricting the flow of hydraulic fluid from the pump thereby causing the pump to apply a braking force to the axle. In one embodiment, the flow of hydraulic fluid from the pump is restricted using valves. In this embodiment, the method can further include the step of controlling the valves from a central location on a train containing the rail car.

These and other objects are also accomplished by providing a braking system for a train containing at least one locomotive connected to at least one rail car. The braking system includes a plurality of hydraulic pumps. Each of the pumps are placed in operative association with a preselected and corresponding rail car axle such that the rotation of the axle drives the corresponding pump. A plurality of fluid reservoirs is included for receiving and supplying a hydraulic fluid to the pumps. Conduit means can be used for connecting the reservoirs with the pumps for allowing a hydraulic fluid to circulate therebetween. The braking system can further include fluid restrictive means for regulating the flow of fluid between the hydraulic pumps and the respective reservoirs, wherein, by restricting the flow of fluid from the pumps, the pumps apply a braking force to the corresponding rail car axles.

The braking system can also include a central control means for controlling the fluid restrictive means from a central location on the train. In one embodiment, the central control means can include a microprocessor.

BRIEF DESCRIPTION OF THE DRAWINGS

A full and enabling disclosure of the present invention, including the best mode thereof, to one of ordinary skill in the art, is set forth more particularly in the remainder of the specification, including reference to the accompanying figures, in which:

FIG. 3 is a side view taken along line 3—3 of FIG. 2;

FIG. 4 is a top view taken along line 4—4 of FIG. 2;

Figure 1:
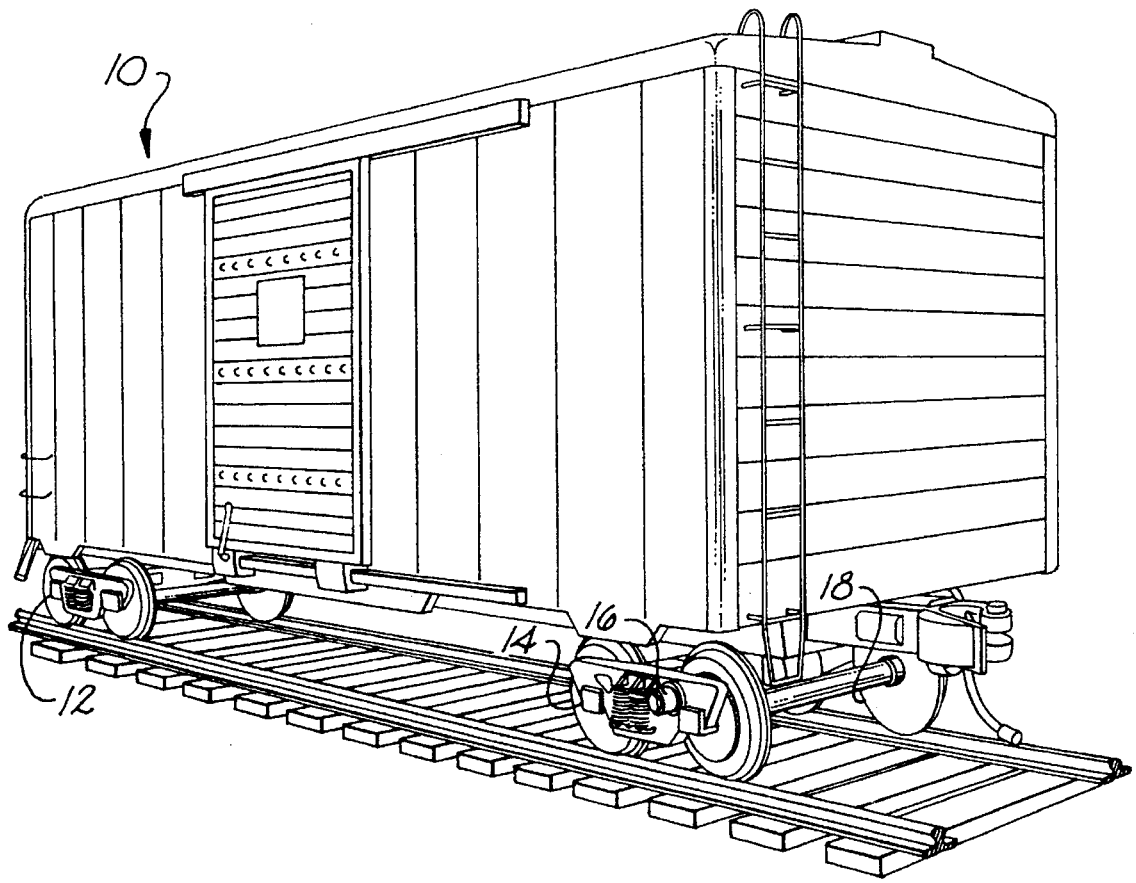
FIG. 1 is a perspective view of a freight car equipped with one embodiment of the braking system of the present invention.

Repeat use of reference characters in the present specification and drawings is intended to represent same or analogous features or elements of the invention.

DETAILED DESCRIPTION OF PREFERRED EMBODIMENTS

It is to be understood by one of ordinary skill in the art that the present discussion is a description of exemplary embodiments only, and is not intended as limiting the broader aspects of the present invention, which broader aspects are embodied in the exemplary construction.

The present invention generally relates to a braking system for a rail car and to a process for applying a braking force to a rail car. Unlike prior art constructions, the braking system of the present invention utilizes hydraulics as opposed to pneumatics for applying a braking force. Specifically, the braking system of the present invention includes a hydraulic pump or motor mounted to a rail car axle and/or wheel assembly. A hydraulic circulation loop circulates a hydraulic fluid from the hydraulic pump to a reservoir and then back to the pump.

The hydraulic pump is driven by the rotation of the rail car axle and/or wheel. Consequently, the rotation of the axle and/or wheel causes the pump to circulate the hydraulic fluid around the circulation loop. By restricting the flow of fluids from the hydraulic pump, the pump in turn applies a braking force to the rail car axle and/or wheel assembly. Valves or any type of fluid restricting means can be installed on the circulation loop in order to control the flow rate of fluid to and from the pump. In one embodiment, the valves can be controlled electronically from a central location on the train.

In this arrangement, the kinetic energy of the car itself drives the pump. No secondary source of power is needed. Further, no brake shoes are used or needed in the braking system of the present invention.

Referring to FIG. 1, a rail car generally 10 is shown. Rail car 10 is supported by a pair of rail car trucks 12 and 14 which ride upon a railroad track. Trucks 12 and 14 generally include a two axle arrangement. As shown in FIG. 1, rail truck 14 includes one embodiment of the present invention. Specifically, a hydraulic pump or motor 16 is shown engaging a rail car axle 18. Hydraulic pump 16 can be used to impart a braking force to axle 18 as will be described hereinafter.

Figure 2:
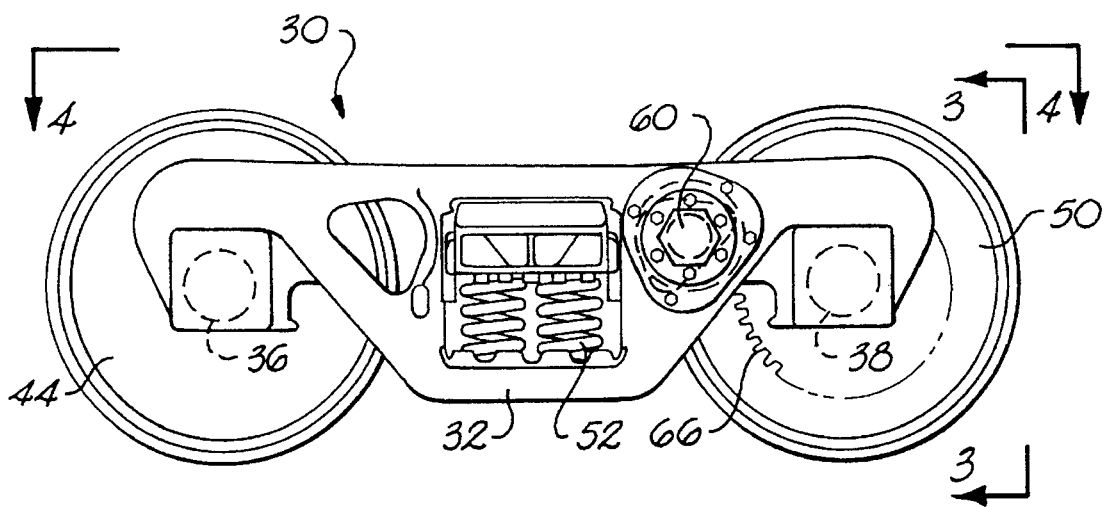
FIG. 2 is a side view of a rail truck illustrating an embodiment of the braking system of the present invention.

Referring to FIGS. 2, 3 and 4, one embodiment of the braking system of the present invention is shown mounted to a rail car truck generally 30. As shown in FIG. 4, rail car truck 30 includes a pair of opposing side frames 32 and 34 supported upon a first rail car axle 36 and a second axle 38. Extending from side frame 32 to side frame 34 between axles 36 and 38 is a truck bolster 40 having a center bowl area 42 adapted to engage and support the body of a rail car. Integral with axles 36 and 38 are four corresponding wheels 44, 46, 48 and 50 adapted to engage a rail. Referring to FIGS. 2 and 3, truck 30 further includes a pair of spring nests 52 and 54 which act as shock absorbers for the rail car.

Referring to the braking system of the present invention, rail truck 30 further includes a hydraulic pump or motor 60 mounted to side frame 32. As shown in FIG. 4, pump 60 includes a drive shaft 62 integral with a first gear 64. Gear 64 is adapted to engage a second gear 66 which is mounted to axle 38.

Figure 7:
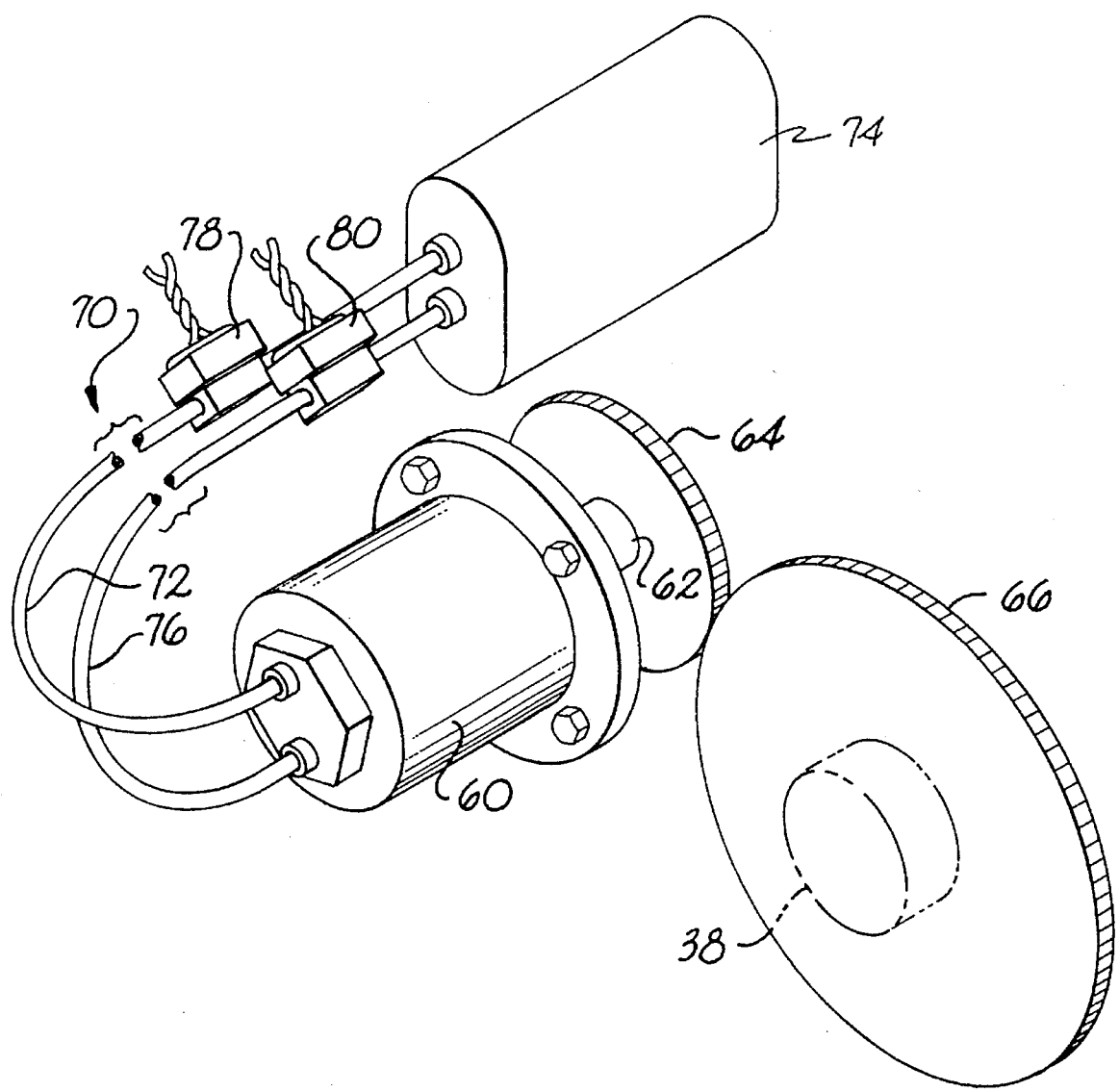
FIG. 7 is a perspective view of another embodiment of the braking system of the present invention.

Referring to FIG. 7, the braking system of the present invention is shown isolated from rail truck 30. In particular, motor or pump 60 is shown having a drive shaft 62 and a first gear 64. As before, gear 64 is adapted to engage gear 66 which is integral with axle 38. The braking system further includes a hydraulic fluid circulation loop generally 70 including an inlet tube 72, a reservoir tank 74, and an outlet tube 76. Hydraulic fluid circulation loop 70 is for circulating a hydraulic fluid to and from pump 60. For controlling the flow rate of hydraulic fluid within the loop, the braking system further includes a first valve 78 located along inlet tube 72 and a second valve 80 located along outlet tube 76.

The general operation and interworkings of the braking system of the present invention will now be described. As shown in FIG. 7, the rotation of axle 38 causes gear 66 to engage and rotate gear 64. The rotation of gear 64 in turn drives pump or motor 60. When driven or pumping, pump 60 circulates a hydraulic fluid around fluid circulation loop 70. Specifically, pump 60 pumps a hydraulic fluid to and from reservoir 74 via outlet 76 and inlet 72, respectively. Preferably, a pump or motor is selected that will circulate fluid around circulation loop 70 regardless of whether axle 38 is rotating clockwise or counter-clockwise.

In order to impart a braking force to axle 38 and therefore slow or stop a moving rail car, valves 78 and 80 can be used to restrict the flow of hydraulic fluid to and from pump 60. Because a hydraulic fluid is substantially incompressible, pump or motor 60 is forced to turn or drive shaft 62 at a slower rate when the fluid flow from pump 60 is restricted. This forced slower rotation is transferred to axle 38 via gears 64 and 66. Consequently, a braking force is applied to axle 38 in proportion to the decrease in flow rate of the hydraulic fluid circulating through loop 70.

There are many advantages to the braking system of the present invention as will be apparent to one skilled in the art. For instance, no outside power source is needed in the braking system of the present invention except for the external force needed to control valves 78 and 80. Another benefit of the present invention is the elimination of brake shoes which are subject to repair and replacement. Further, by eliminating brake shoes, the wheels of the rail car are not subjected to thermal gradients caused by the shoes. Further advantages of the braking system of the present invention will be apparent from the further description which follows.

Referring to FIG. 7, the various components of the braking system of the present invention will now be discussed in more detail. For instance, in the embodiment shown, gear 66 has a larger diameter than gear 64. However, any gear arrangement or gear ratio may be used in the present invention. In particular, it may be more desirable to include further gears or to adjust the relative sizes of gears 64 and 66.

Also, using gears to interconnect pump 60 with axle 38 provides merely one alternative for engaging the braking system with a rail car. For instance, in another embodiment, a roller bearing integral with the hydraulic pump can be used to engage the rail car axle. The bearing may include a bearing adapter and can be mounted within a side frame as one skilled in the art would be familiar with.

The size and power requirements of pump or motor 60 depend upon a number of factors including the number of motors installed on a rail car, the weight and size of the rail car, the anticipated maximum speed of the rail car, and the estimated load capacity of the rail car. In general, it is believed that a 75 horsepower motor is needed per wheel or, in other words, a 150 horsepower motor per axle should provide sufficient power to stop a moving car. For instance, in a typical rail car containing four axles and four sets of wheels, a 150 horsepower motor can be installed on each axle for supplying a sufficient braking force. Further, any type of pump or motor that transmits fluid may be used in the present invention.

The purpose of reservoir tank 74 is not only to provide and receive hydraulic fluid from pump 60, but is also included to act as a heat sink for the hydraulic fluid. For instance, during operation the hydraulic fluid will increase in temperature due to the energy transferred to the fluid by the motor or pump. Preferably, tank 74 is sized so that the fluid will not increase in temperature to a point that will harm or damage the braking system. For instance, if the fluid were to get too hot, the increased temperature may begin to breakdown lubricants contained within motor 60. If these lubricants were to degrade, damage or harm may result to motor 60.

Besides including reservoir tanks with larger volumes for holding appropriate amounts of hydraulic fluid, tank 74 can include other means for cooling the circulating hydraulic fluid. For instance, as shown in FIGS. 3 and 4, tank 74 is mounted to or near bolster 40 in the middle of rail truck 30. At this position, tank 74 will be cooled by the air flow resulting from the moving train. To increase and optimize the heat transfer, various cooling fins or other similar devices can be installed upon tank 74 similar to the construction of a radiator.

Optionally, the braking system of the present invention can include a bypass conduit for bypassing the reservoir tank if desired. Valves can be included for directing the fluid around the selected path. Bypassing the reservoir tank may be advantageous in situations where heat buildup in the hydraulic fluid is not a concern.

The valves selected for use in the circulation loop of the present invention can also vary depending upon various system conditions. In general, any fluid restricting means or valve device may be used in the present invention. However, preferably the valves selected will be capable of restricting the flow rate of the hydraulic fluid in infinite increments. In a preferred embodiment, screw drive valves can be used.

As shown in FIG. 7, preferably a combination of two valves 78 and 80 are used in the braking system of the present invention. By using two separate valves, a braking force can be applied to a rail car when the rail car is moving in a forward direction or when the rail car is moving in a reverse direction. Valves 78 and 80 can also be used simultaneously in order to more effectively control the flow rate of the hydraulic fluid and to equalize the pressure within the system. Further, by closing off both valves when a rail car is parked, movement in any direction will be restricted.

Further, the valves used in the present invention can be actuated by any means desired. For instance, the valves can be air actuated, electronically controlled, or even manually operated. Preferably, the valves used in the braking system of the present invention will be capable of being controlled simultaneously from a central location on a train in order to ensure quick response times and to eliminate problems associated with the bunching of rail cars.

Referring to FIG. 4, an exemplary embodiment of the braking system of the present invention is illustrated including automatic control devices. As described above, the braking system includes hydraulic pump 60 connected to reservoir tank 74 via inlet and outlet tubes 72 and 76. Tubes 72 and 76 can be placed and mounted on rail truck 30 in any desired location. For instance, in one embodiment tubes 72 and 76 can be positioned along bolster 40 to tank 74. FIG. 4 is merely diagrammatical so as to illustrate and more clearly show all elements of the present invention.

As shown in FIG. 4, the braking system further includes valves 78 and 80 that, in this embodiment, are activated electronically. Specifically, valves 78 and 80 are connected to a solid state control 82 through a signal carrying means or wire 90. Control 82 is further connected to a central control unit 84 which, for example, can be a microprocessor. Microprocessor 84 can include various user operated activators and input panels for allowing a user to enter a command and thereafter control the velocity of the rail car through control of valves 78 and 80. In one embodiment of the present invention, central control unit 84 can merely include controls that correspond to the opening and closing of valves 78 and 80.

In an alternative embodiment, the braking system of the present invention can further include one or more velocity sensing devices represented at 86 and 88. Velocity sensing devices 86 and 88 can be positioned at any location upon rail truck 30 that would permit the detection of the velocity of the rail car. In one embodiment, velocity sensing devices 86 and 88 can include velocity transducers which monitor the velocity of an object in relation to another object. These types of transducers are capable of generating a signal and electronically sending information to central control unit 84.

In a preferred embodiment of the present invention, one or more of the braking systems illustrated in FIG. 7 are installed on each rail car on a train led by a locomotive. The braking systems installed on a particular car can share a common reservoir tank 74 or can include singular tanks for each system. Each braking system or rail car can include two velocity transducers 86 and 88 or other similar velocity monitoring means. One transducer can be arranged to monitor the speed of the rail car or a wheel of the rail car in relation to the ground or the track. The other transducer can be arranged to monitor the rotational speed of the wheel.

The train can further include one common central control unit or microprocessor 84 which can be installed in the locomotive or, at least, can be user accessed from the locomotive for operation by the conductor of the train. Microprocessor 84 can be electrically connected to each and every transducer installed on the train. The transducers can then send signals to microprocessor 84 for indicating the velocity of the individual cars and the car wheels. Further, valves 78 and 80 can be electronically activated and can be similarly connected to microprocessor 84. Consequently, microprocessor 84 can receive velocity information from the transducers and in response control valves 78 and 80 anywhere on the train in order to adjust the speed or velocity of the train in response to a user's commands, by applying a selected retardation rate to each individual rail car.

In this arrangement, the braking system of the present invention can be operated similar to the method in which conventional pneumatic braking systems are operated as was described above. However, by using programmable controls and an electronic delivery system, many more features and commands can be added to the braking system of the present invention. For instance, besides manual controls for slowing and stopping the train, microprocessor 84 can be programmed to run more precision oriented commands.

Examples of such commands could include a service stop command, a deceleration command, a maintain speed command or an emergency stop command. Further, all of these commands can be carried out with an anti-locking feature that prevents the wheels of the train from locking during braking.

The first command identified above, the service stop command, can be included within the braking system of the present invention in order to stop a train over a specified distance. For instance, if it would be desirable to stop a moving train at a particular point down the track, this command would be entered into microprocessor 84. The microprocessor can then determine the current speed of the train and by knowing the distance when the train is to be stopped can calculate a deceleration rate or a deceleration rate profile. The braking system of the present invention can then automatically and uniformly slow the train to a stop at the desired point. During the braking process, microprocessor 84 can continuously receive signals from transducers 86 and 88 in order to adjust valves 78 and 80 in order to stay within the calculated deceleration rate profile. Further, if the wheels were to lock during this process, the transducers would indicate that the wheels are not rotating yet the train is still moving. If this were to occur, microprocessor 84 would immediately adjust the valve settings in order to prevent further locking of the wheels. As is well known in the art, when the wheels of a train lock and slide along the track, braking efficiency is severely reduced. Also, locking the wheels puts much more stress on the wheels and associated parts. Consequently, locking the wheels during braking is an undesired result.

Other commands that can be programmed into the braking system of the present invention include a deceleration command and a maintain speed command. A deceleration command is for decelerating the train in order to reduce speed. Using the deceleration command, a user or conductor can either enter a deceleration rate or the reduced speed desired into microprocessor 84. The braking system can then process the command and apply a braking force to the train in accordance with the command.

A maintain speed command, which works similar to a deceleration command, is used, for instance, in situations in which a train must travel down a steep grade or hill. When using this command, a particular velocity can be entered into microprocessor 84 or the braking system can be placed at a particular setting and the velocity can be maintained by the braking system of the present invention while the train is traveling down a steep grade. The maintain speed command and the deceleration command can also include anti-lock features as described above.

Another useful command that can be programmed into the braking system of the present invention is an emergency stop command. This command is for when it is necessary to stop the train as quickly as possible. Upon entering this command into microprocessor 84, a braking force will be immediately applied to the train, but without locking the wheels. Preferably, microprocessor 84 will automatically and continuously adjust valves 78 and 80 corresponding to the point where the wheel and track are at the maximum coefficient of friction. The maximum coefficient of friction is obtained when a braking force is applied to the wheels that is slightly insufficient to cause the wheels to lock. In this mode, the train will stop over the shortest distance possible.

Figure 5:
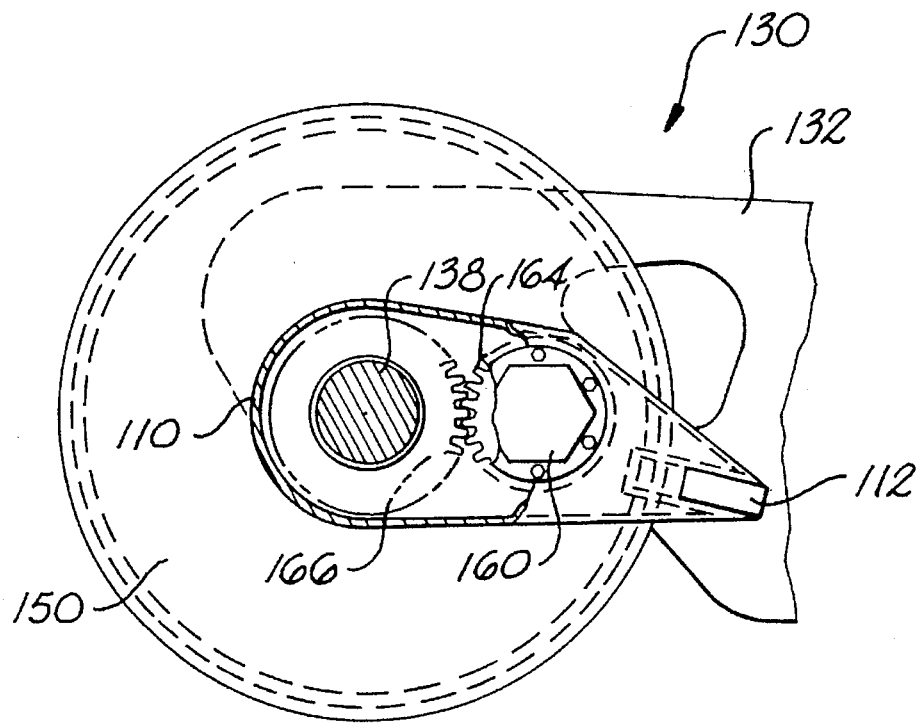
FIG. 5 is a side view with cut-away portions of another embodiment of the braking system of the present invention installed on a rail truck.
Figure 6:
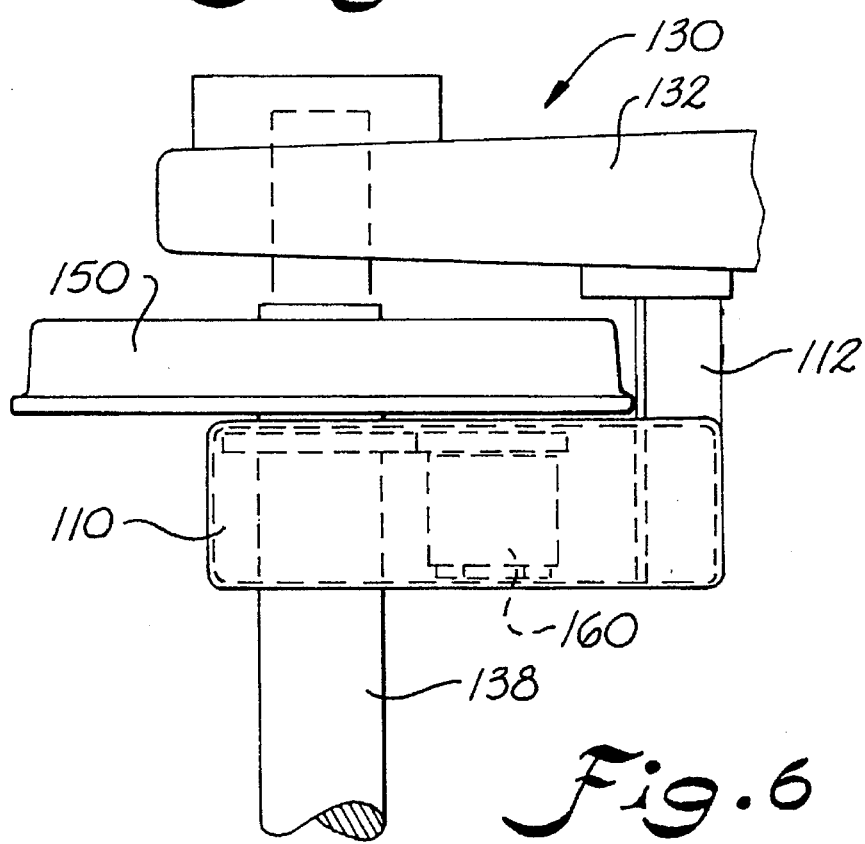
FIG. 6 is a plan view of the embodiment illustrated in FIG. 5.

Referring to FIGS. 5 and 6, another embodiment of the braking system of the present invention is illustrated. As shown, a portion of a rail car truck 130 is included having a side frame 132. Side frame 132 is mounted to an axle 138 which includes a wheel 150. Referring to FIG. 5, axle 138 includes a gear 166 which is adapted to engage a second gear 164. Gear 164 is integral with a hydraulic motor or pump 160.

In this embodiment, hydraulic pump 160 is contained within a housing 110 which also encircles a portion of axle 138. Housing 110 is further connected to a bar 112 which anchors the housing and hydraulic pump to side frame 132. Bar 112 is needed so that the housing and hydraulic motor arrangement do not rotate around axle 138 during operation.

The braking system illustrated in FIGS. 5 and 6 is also adapted to receive a hydraulic circulation loop similar to the circulation loop illustrated in FIGS. 4 and 7. In the embodiment illustrated in FIGS. 5 and 6, hydraulic pump 160 is shown mounted to the inside of wheel 150 and side frame 132 and therefore does not protrude from rail truck 130 as is shown in FIG. 4. As such, in this embodiment, hydraulic pump 160 is in a more protected position which may be more desirable depending upon the particular circumstances.

These and other modifications and variations to the present invention may be practiced by those of ordinary skill in the art, without departing from the spirit and scope of the present invention, which is more particularly set forth in the appended claims. In addition, it should be understood that aspects of the various embodiments may be interchanged both in whole or in part. Furthermore, those of ordinary skill in the art will appreciate that the foregoing description is by way of example only, and is not intended to be limitative of the invention so further described in such appended claims.

What is claimed is:

1. A braking system for a rail car, said braking system comprising:

a hydraulic pump in operative association with an axle of a rail car such that said hydraulic pump is driven by said axle when the axle is rotating either clockwise or counterclockwise;

a hydraulic fluid circulation loop in communication with said hydraulic pump for supplying, receiving and circulating a hydraulic fluid to and from said pump, said hydraulic fluid circulation loop comprising a hydraulic fluid reservoir, a first conduit connecting said reservoir to said hydraulic pump and a second conduit also connecting said reservoir to said hydraulic pump for completing said loop; and a first fluid restrictive device positioned along said first conduit and a second fluid restrictive device positioned along said second conduit, said first and second restrictive devices for regulating the flow of hydraulic fluid to and from said hydraulic pump, wherein by restricting the flow of fluid from said pump when said axle of said rail car is rotating, said pump exerts a braking force on said axle.

2. The braking system as defined in claim 1, wherein said hydraulic pump is in operative association with a rail car wheel.

3. The braking system as defined in claim 1, further comprising control means for controlling said first and second fluid restrictive devices.

4. The braking system as defined in claim 3, wherein said control means includes a user operated activator for sending electronic signals to said first and second fluid restrictive devices for selectively opening and closing same.

5. The braking system as defined in claim 3, wherein said control means includes a microprocessor having a user operated input means for receiving commands from a user.

6. The braking system as defined in claim 5, further comprising velocity monitoring means for sensing the velocity of a rail car wheel in relation to a railway track, said velocity monitoring means sending electronic signals to said microprocessor for determining the appropriate braking force needed to be applied to said rail car for carrying out a user command.

7. The braking system as defined in claim 6, wherein, when said velocity monitoring means indicates said rail car is moving but said rail car wheel is not, said microprocessor instantaneously adjusts said fluid restrictive means for preventing said wheel from locking and sliding on said railway track.

8. The braking system as defined in claim 6, wherein said velocity monitoring means includes at least one velocity transducer.

9. The braking system as defined in claim 1, wherein said first and second fluid restrictive devices comprise valves that are electronically activated.

10. The braking system as defined in claim 1, further comprising at least one gear connected to said hydraulic pump for engaging a corresponding gear affixed to said axle of said rail car.

11. The braking system as defined in claim 1, wherein said hydraulic pump is integral with a bearing arrangement for operatively engaging said axle.

12. A braking system for a rail car, said braking system comprising:

a hydraulic pump;

engagement means for operatively connecting said hydraulic pump to a rail car axle;

a hydraulic fluid circulation loop in communication with said hydraulic pump, said circulation loop including a hydraulic fluid reservoir means, a first fluid carrying means extending from said hydraulic pump to said reservoir means, and a second fluid carrying means extending from said reservoir means to said pump for completing said loop, wherein an incompressible hydraulic fluid is circulated around said loop by said pump when said rail car axle is rotating;

a first fluid restrictive device positioned along said first fluid carrying means and a second fluid restrictive device positioned along said second fluid carrying means, said first and second fluid restrictive devices for regulating the flow of fluid around said hydraulic fluid circulation loop; and control means for controlling said first and second fluid restrictive devices, wherein by restricting the flow of fluid from said hydraulic pump, a braking force is applied to said rail car axle.

13. The braking system as defined in claim 12, wherein said engagement means comprises at least one gear connected to said hydraulic pump for engaging a corresponding gear affixed to said axle of said rail car.

14. The braking system as defined in claim 12, wherein said control means includes a microprocessor in operative communication with said first and second fluid restrictive devices for selectively opening and closing same.

15. The braking system as defined in claim 14, further including at least one velocity transducer for sensing the velocity of a rail car wheel in relation to a railway track, said at least one velocity transducer sending electronic signals to said microprocessor for determining the appropriate braking force needed to be applied to said rail car axle.

16. A plurality of interconnected rail cars, wherein a selected number of said rail cars are equipped with the braking system as defined in claim 12.

17. A braking system for a plurality of interconnected rail cars, said braking system comprising:

a plurality of braking units, each of said braking units comprising a hydraulic pump in operative association with a preselected and corresponding rail car axle of a rail car, such that the rotation of said axle drives said hydraulic pump, said hydraulic pump being in fluid communication with a hydraulic fluid circulation loop for supplying and circulating a hydraulic fluid to and from said pump, said circulation loop including a fluid reservoir, a first conduit extending between said reservoir and said hydraulic pump and a second conduit also extending between said reservoir and said hydraulic pump for completing said loop, each of said braking units further comprising at least one fluid restrictive device positioned along said circulation loop, wherein by restricting the flow of fluid from said pump, said pump applies a braking force to said rail car axle;

at least one velocity sensing device for each of said rail cars that are equipped with at least one of said braking units, said velocity sensing devices for sensing the relative velocity of said corresponding rail cars; and central control means adapted to receive commands for decelerating said rail cars, said central control means being configured to receive information from each of said velocity sensing devices and being configured to independently control each of said fluid restrictive devices of said braking units, wherein, when said rail cars are being decelerated, said central control means, based on information received from each of said velocity sensing devices, individually controls each of said fluid restrictive devices so that a corresponding braking force is applied to each of said respective rail car axles for causing said plurality of rail cars to decelerate at a constant rate.

18. The braking system as defined in claim 17, wherein said central control means includes a microprocessor.

19. The braking system as defined in claim 17, wherein said central control means is electrically connected to each of said fluid restrictive devices and to each of said velocity sensing devices.

20. The braking system as defined in claim 17, wherein each of said braking units comprise a first fluid restrictive device positioned along said first conduit and a second fluid restrictive device positioned along said second conduit.

21. The braking system as defined in claim 17, wherein for each of said rail car axles that are in operative association with one of said braking units, said braking system includes a first velocity sensing device and a second velocity sensing device, said first velocity sensing device for sensing the velocity of a respective rail car wheel in relation to a railway track, and said second velocity sensing device for sensing the rotational velocity of said rail car wheel.

22. The braking system as defined in claim 17, wherein, when one of said velocity sensing devices indicates said rail car is moving but a corresponding rail car wheel is not, said central control means instantaneously adjusts corresponding fluid restrictive devices for preventing said wheel from locking and sliding on a railway track.

* * * * *